United States Patent [19]

Skarlupka

[11] Patent Number: 5,426,149
[45] Date of Patent: Jun. 20, 1995

[54] POLYMERS OF STYRENE

[75] Inventor: Randy J. Skarlupka, Bartlesville, Okla.

[73] Assignee: Phillips Petroleum Company, Bartlesville, Okla.

[21] Appl. No.: 153,235

[22] Filed: Nov. 15, 1993

[51] Int. Cl.$^6$ .............. C08L 53/02; C08L 51/00; C08K 3/40

[52] U.S. Cl. .................. 524/504; 524/505; 524/531; 525/96; 525/74; 525/98; 525/93

[58] Field of Search ........... 525/309, 74, 96, 93, 525/98; 524/504, 505, 531, 494

[56] References Cited

U.S. PATENT DOCUMENTS

| | | |
|---|---|---|
| 3,842,059 | 10/1974 | Milkovich et al. |
| 4,258,150 | 3/1981 | Cobb ........................ 525/316 |
| 4,530,966 | 7/1985 | Shiraki et al. ............. 525/89 |
| 4,530,967 | 7/1985 | Shiraki et al. ............. 525/89 |
| 4,638,072 | 12/1986 | Shiraki et al. ............. 525/57 |
| 4,657,970 | 4/1987 | Shiraki et al. ............. 525/57 |
| 4,657,971 | 4/1987 | Shiraki et al. ............. 525/57 |
| 4,820,768 | 4/1989 | Shiraki et al. ............. 525/92 |
| 4,839,425 | 6/1989 | Mawatari et al. ........... 525/92 |
| 4,927,889 | 5/1990 | Shiraki et al. ............. 525/285 |
| 4,972,020 | 11/1990 | Shiraki et al. ............. 525/90 |
| 4,994,508 | 2/1991 | Shiraki et al. ............. 524/14 |
| 5,055,523 | 10/1991 | Inoue et al. ............... 525/148 |
| 5,147,952 | 9/1992 | Mori et al. ................. 526/220 |
| 5,310,813 | 5/1994 | Nagasawa et al. .......... 525/309 |

OTHER PUBLICATIONS

RESEDA Produce Brochure on macromonomer-based graft polymers with a comb-like structure, Marubeni Specialty Chemicals Inc., White Plains, N.Y., undated.

Primary Examiner—James J. Seidleck
Assistant Examiner—Mark L. Warzel
Attorney, Agent, or Firm—Morrison Bennett; K. K. Brandes

[57] ABSTRACT

Glass reinforced of epoxy modified styrene/styrene copolymer and one or more polymers of styrene, are provided.

Methods of making these blends and articles made therefrom are provided.

20 Claims, No Drawings

POLYMERS OF STYRENE

FIELD OF THE INVENTION

This invention relates to glass reinforced blends of polymers of styrene and epoxy modified styrene/styrene copolymers.

BACKGROUND OF THE INVENTION

Various blends of polymers of styrene have been used to produce resins which can be made into glass reinforced articles which exhibit advantageous mechanical properties.

However, there is a continuing need for resin blends which can be injection molded or extruded into glass reinforced articles having improved tensile strength and stiffness or flexural strength without compromising impact strength or other properties such as thermal stability.

SUMMARY OF THE INVENTION

It is an object of this invention to provide blends of polymers of styrene which can be extruded or injection molded into articles having an excellent combination of improved impact strength, tensile strength and flexural modulus.

It is another object of this invention to provide methods for making such compositions.

It is also an object of this invention to provide articles made from such compositions.

In accordance with one embodiment of this invention, resin blends which can be extruded or injection molded into articles having improved tensile strength, impact strength and flexural modulus comprise:
- (a) at least one epoxy modified styrene tyrene copolymer;
- (b) at least one polymer of styrene; and
- (c) glass;
  wherein said at least one polymer of styrene is exclusive of said epoxy modified styrene/styrene copolymer.

In accordance with other embodiments of this invention, processes are provided for preparing these compositions and articles made from the compositions of this invention are provided.

DETAILED DESCRIPTION OF THE INVENTION

It has been discovered that improvements in properties of extruded or molded articles made with glass reinforced polymers of styrene can be obtained by blending therewith epoxy modified styrene/styrene copolymers. These blends can be extruded or injection molded into articles which have improved tensile strength, impact strength, and flexural modulus. Depending upon intended application, the balance of these properties can be tailored to fit the particular need by choice of relative amounts of different polymers of styrene in the blend. These invention resin blends can be used for a broad range of indoor and outdoor structural components, consumer products, household equipment, and other applications requiring a good balance of physical properties such as impact strength, tensile strength and flexural strength.

In accordance with one particular embodiment of this invention, the polymer of styrene is polystyrene.

In accordance with another particular embodiment of this invention, the polymer of styrene is a monovinyl aromatic-conjugated diene copolymer.

In accordance with yet another particular embodiment of this invention, resin blends which can be extruded or injection molded into articles having improved tensile strength, impact strength and flexural modulus comprise, or alternatively, consist essentially of:
- (a) an epoxy modified styrene/styrene copolymer;
- (b) a monovinyl aromatic-conjugated diene copolymer;
- (c) a polymer of styrene; and
- (d) glass;
  wherein said polymer of styrene is exclusive of said monovinyl aromatic-conjugated diene copolymer and exclusive of said epoxy modified styrene/styrene copolymer.

In one embodiment, the blend compositions of this invention more particularly comprise:
- (a) from about 1 to about 35 weight percent, more preferably from about 2 to about 20 weight percent, and most preferably from about 3 to about 15 weight percent, based on total weight of the composition, of an epoxy modified styrene/styrene copolymer;
- (b) from about 15 to about 94 weight percent, more preferably from about 40 to about 91 weight percent, and most preferably from about 55 to about 87 weight percent, based on total weight of the composition, of at least one polymer of styrene; and
- (c) from about 5 to about 50 weight percent, more preferably from about 7 to about 40 weight percent, and most preferably from about 10 to about 30 weight percent, based on total weight of the composition, of glass.

In another embodiment, the at least one polymer of styrene of the blend of the above-stated embodiment can be a combination of a resinous monovinyl aromatic-conjugated diene block copolymer and another polymer of styrene exclusive of the epoxy modified styrene/styrene copolymer, with the resinous monovinyl aromatic-conjugated diene present in the range from about 2 to about 98 weight percent, more preferably from about 50 to about 90 weight percent, and most preferably from about 70 to about 85 weight percent, based on total weight of the polymers of styrene exclusive of the epoxy modified styrene/styrene copolymer; and with the other polymer of styrene exclusive of the resinous monovinyl aromatic-conjugated diene block copolymer and the epoxy modified styrene/styrene copolymer present in the range from about 2 to about 98 weight percent, more preferably from about 10 to about 50 weight percent, and most preferably from about 15 to about 30 weight percent, based on total weight of the polymers of styrene exclusive of the epoxy modified styrene/styrene copolymer.

In the latter embodiment, the relative amounts of resinous monovinyl aromatic-conjugated diene and other polymer(s) of styrene are chosen according to the relative priority given objectives such as economic advantage, processability and performance and the desired balance of physical properties such as impact strength, flexural strength and tensile strength.

Optionally, the compositions of this invention may contain additional additives.

POLYMER OF STYRENE

"Polymer of styrene" as used in this application will refer to polymers of styrene including but not limited to homopolymers such as polystyrene, poly(α-methylstyrene), and poly(chlorostyrene); rubber modified polystyrenes such as high impact polystyrene (HIPS); styrene-containing copolymers such as styrene-chlorostyrene copolymers, styrene-bromostyrene copolymers, styrene-α-methylstyrene copolymers, acrylic-styrene-acrylonitrile copolymers (ASA), styrene-acrylonitrile copolymers (SAN), styrene-acrylonitrile-α-alkylstyrene copolymers, acrylonitrile-butadiene-styrene copolymers (ABS), and styrene-maleic anhydride copolymers; and resinous monovinyl aromatic-conjugated diene copolymers. Mixtures of polymers of styrene are also contemplated as useful in the present invention.

One group of presently preferred polymers of styrene employed in the blends of this invention are usually (a) homopolymers of styrene; or (b) copolymers of styrcue as a major component with a minor amount, e.g., up to 20 weight percent, of any other copolymerizable monovinyl aromatic compound other than styrene, such as α-methylstyrene or vinyltoluene. In these copolymers of styrene as a major component, a minor amount, e.g., up to 20 weight percent, of other monomers such as methyl acrylate, methyl methacrylate, acrylonitrile and the like can be copolymerized with the styrene.

Many of the styrene resins in this group of presently preferred polymers of styrene are commonly prepared in bulk polymerization by heating the styrene and any comonomer at temperatures in the range of 100° to 200° C. with application of pressure, if necessary, to combine the monomers. The polymerization can also be carried out at lower temperatures by the addition of free-radical generating peroxidic catalysts such as benzoyl peroxide, acetyl peroxide, di-t-butyl peroxide and the like. Alternatively, the polymerization can be carried out in suspension to yield a dry powder or in emulsion, usually resulting in a latex of polystyrene which can be coagulated to yield the solid powdery polystyrene. The polymerization can also be carried out in solution with precipitation of the product, if desired. Solvent can be removed by standard techniques such as steamstripping or solvent evaporation.

Other methods of preparation of polystyrene, polymers of styrene and modified polymers of styrene are described in such publications as *Billmeyer's Textbook of Polymer Science, Interscience Publishers, N.Y.*, 1966.

Suitable high impact polystyrenes (HIPS) can be prepared by polymerizing styrene in the presence of an elastomer, typically polybutadiene rubber. In these resins the polystyrene forms the major portion of the resin throughout which the polystyrene-rubber graft polymers are dispersed. Other methods of preparation are known in the art and described in technical publications.

Another group of presently preferred polymers of styrcue employed in the blends of this invention are monovinyl aromatic-conjugated diene copolymers. Monovinyl aromatic-conjugated diene copolymers can be employed as the only polymer of styrene in this invention or as one of two or more polymers of styrene.

The monovinyl aromatic-conjugated diene copolymers useful in this invention are resinous block copolymers which are most often derived from a monovinyl aromatic compound and a conjugated diene. These include such block copolymers as the types AB, ABA, tapered AB and ABA and copolymers with varying degrees of coupling including branched or radial (star block) copolymers, where A represents a polymerized monovinyl aromatic compound and B represents a polymerized conjugated diene. Other polymodal resinous block copolymers with different sequences of A and B blocks are also contemplated as useful in the present invention.

The resinous A blocks can be polymerized styrene, α-methylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene and condensed aromatics such as vinyl napthalane and mixtures thereof. The A blocks can be random or tapered monovinyl aromatic/conjugated diene copolymer. Presently preferred for A blocks is styrene. The rubbery B blocks can be polybutadiene, polypentadiene, a random or tapered monovinyl aromatic/conjugated diene copolymer, polyisoprene, a random or tapered monovinyl aromatic-isoprene copolymer, or mixtures thereof. Presently preferred for B blocks is butadiene and/or isoprene.

For most applications, polymodal monovinyl aromatic-conjugated diene block copolymers having a Shore D hardness as measured by ASTM D 2240-86 of about 50 or higher, more preferably from about 64 to about 80, are presently preferred. These copolymers, having resinous properties and monovinyl aromatic content as a major component, contain from about 55 to about 95 weight percent polymerized monovinyl aromatic monomer, more preferably from about 65 to about 90 weight percent, and most preferably from about 70 to about 85 weight percent polymerized monovinyl aromatic monomer, based on total weight of the copolymer. The remainder of the block copolymer is polymerized conjugated diene. They are prepared so that at least a portion of the final product is of a coupled character, linear or branched or both linear and branched.

The generally desired melt flow of the monovinyl aromatic-conjugated diene copolymer can be in the range from about 7 g/10 min to about 15 g/10 rain, more preferably from about 8 g/10 rain to about 12 g/10 min. Above about 25 g/10 min the physical properties are not suitable. Below about 2 g/10 min the melt flow is so low that processability is decreased, melt flow drop-off increases and good mixing is more difficult to achieve.

A single monovinyl aromatic-conjugated diene copolymer or mixtures of more than one monovinyl aromatic-conjugated diene copolymer are considered useful in this invention.

Basic preparation of the useful monovinyl aromatic-conjugated diene block copolymers is disclosed in U.S. Pat. No. 2,975,160, hereby incorporated herein by reference.

The presently preferred polymodal block copolymers can be produced in accordance with U.S. Pat. Nos. 3,639,517 and 3,251,905. More specifically, they can be prepared by sequential charge copolymerization in the presence of a randomizer using initiator to promote polymodality, such as for example, the methods described in U.S. Pat. Nos. 4,584,346, 4,091,053, 4,704,434 and 4,704,435, the disclosures of which are hereby incorporated herein by reference.

The polymer or polymers of styrene is present in an amount sufficient to provide an adequate resin matrix for the fiber, i.e., an amount sufficient to welt out the glass reinforcing material. Use of too much polymer or polymers of styrene will result in a material with less tensile strength and stiffness, i.e., lower values for flexural modulus in articles made therefrom. Use of too little polymer or polymers of styrene will result in poorer properties in articles made therefrom because of poor wetting out of the glass reinforcing material.

When the polymers of styrene are a mixture of polystyrene and monovinyl aromatic-conjugated diene copolymer, the polystyrene is present in an amount sufficient to add stiffness or flexural strength to glass reinforced articles made from the resin and the monovinyl aromatic-conjugated diene copolymer is present in an amount sufficient to add impact strength to glass reinforced articles made from the resin. Use of too much polystyrene and too little monovinyl aromatic-conjugated diene will result in brittleness in glass reinforced articles made from the resin. Use of too little polystyrene and too much monovinyl aromatic-conjugated diene copolymer will result in loss of flexural strength and economic advantage in glass reinforced articles made from the resin.

EPOXY MODIFIED STYRENE/STYRENE COPOLYMER

In addition to the polymer of styrene and/or monovinyl aromatic-conjugated diene copolymer, the blends of this invention contain an epoxy modified styrene/styrene copolymer. The epoxy modified styrene/styrene copolymers useful in this invention are macromonomer-based graft polymers with a comb-like structure. High molecular weight styrene-based macromolecular monomers are copolymerized with low molecular weight styrenic segments having epoxy-functional groups. Processes for making macromolecular monomers having polystyrene skeletons are known in the art and include anionic living polymerization of styrene initiated by organometal alkali compounds followed by termination steps as described in U.S. Pat. No. 3,842,059, hereby incorporated herein by reference.

Copolymers having epoxide groups can be obtained by copolymerization of macromonomers with esters by any of several methods. One such method is described in U.S. Pat. No. 4,868,262, hereby incorporated herein by reference.

The low molecular weight epoxy modified polymer of styrene can be produced according to any known polymerization method such as emulsion polymerization, solution polymerization, bulk polymerization, suspension polymerization, bulk-solution polymerization, bulk-suspension polymerization or the like.

The epoxy group-containing polymers of styrene have in the molecules epoxy groups and unsaturations which are copolymerizable with the styrenic macromolecular monomers.

A presently preferred epoxy modified styrene/styrene graft copolymer can be depicted thusly,

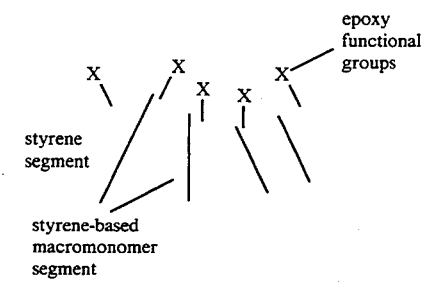

Suitable epoxy modified styrene/styrene graft copolymers are commercially available under the tradename RESEDA from Marubeni Specialty Chemicals, Inc., White Plans, N.Y.

The epoxy-modified styrene/styrene copolymer is present in an amount sufficient to improve flexural modulus and/or impact strength and/or tensile strength in glass reinforced articles made from the resin. Use of too much epoxy modified styrene/styrene copolymer will result in loss of economic advantage and possible decrease in impact strength in glass reinforced articles made from the resin. The desired improvement in properties will not be achieved if too little epoxy modified styrene/styrene copolymer is used.

GLASS

The glass reinforcement improves the properties, such as, for example, the mechanical and thermal properties, of the polymer. Glass reinforcements having a variety of compositions, filament diameters and forms are useful in this invention.

The diameter of the glass fiber is preferably less than 20 micrometers ($\mu$m), but may vary from about 3 to about 30 $\mu$m. Glass fiber diameters are usually given a letter designation between A and Z. The most common diameters used in glass reinforced thermoplastics are G-filament (about 9 $\mu$m) and K-filament (about 13 $\mu$m).

Several forms of glass products can be used for reinforcing polymers. These include powder, flakes, beads, chopped fibers, continuous filaments, etcetera. Continuous filament strands are generally cut into lengths of 1/8, 3/16, ¼, ½, ¾, and 1 inch or longer for compounding efficacy in various processes and products.

Any silicon oxide material can be used. Examples of types of glass include, but are not limited to, type A glass (an alkali glass), type E glass (a boroaluminosilicate), type C glass (a calcium aluminosilicate), and type S glass (a high-strength glass). Type E glass is presently preferred due to economic reasons and commercial availability.

Commercial glasses sold for use as reinforcement material in polymers are usually sized during either the fiber formation process or in a posttreatment, and thus are sold with sizing materials already incorporated.

The amount of sizing on the glass fiber product typically ranges from about 0.2 to about 1.5 weight percent based on total weight of the glass and the sizing, although loadings up to 10 percent may be added to mat products.

Depending upon which polymer is to be used, the intended applications, and variations in glass processed by different manufacturers even for the same intended end uses, there are differences in the sizing compositions. The compositions are usually proprietary and many are not disclosed by the manufacturers.

The sizing compositions usually contain a lubricant, which provides protection for the glass fiber strand; a film-former or binder which gives the glass strand integrity and workability; and a coupling agent which provides better adhesion between the glass fiber strand and the polymeric materials that are being reinforced with the glass fiber strand. The lubricant, film-former, and coupling agent can be a single compound or a mixture of two or more compounds. Additional agents which may be used in sizing compositions include emulsifiers, wetting agents, nucleating agents, and the like.

The film-former is usually water soluble or water emulsifiable during processing and must be non-sensitive to water after curing. Examples of film-formers include, but are not limited to, polyesters, epoxy resins, polyurethanes, polyacrylates, polyvinyl acetates, polyvinyl alcohols, styrene-butadiene latexes, starches, and the like.

The coupling agent is usually a silane coupling agent that has a hydrolyzable moiety for bonding to the glass and a reactive organic moiety that is compatible with the polymeric material which is to be reinforced with the glass fibers.

One glass fiber reinforcement suitable for use in this invention is produced by CertainTeed Corporation of Valley Forge, Pa., and marketed under the trade designation of Chopped Strand 930, K-filament glass fibers. This glass is marketed for use in polybutylene terephthalate, polycarbonate and styrenic resin systems. Another glass fiber reinforcement which is suitable for use in this invention is that manufactured by PPG Industries, Inc., of Pittsburgh, Pa., and marketed under the trade designation Type 1156 Chopped Strand, G-filament glass fibers. PPG Type 1156 glass is marketed for use in thermoset resin systems such as phenolic, epoxy, DAP (diallyl phthalate), and thermoset polyesters.

The glass is present in an amount sufficient to produce the desired flexural and tensile strength in articles made from the invention resins. Using too small an amount of glass fiber does not improve the polymer properties. Having too much glass fiber results in not enough polymer to coat the glass fibers; i.e., the fibers are not "wetted out".

ADDITIVES

The blends of this composition may contain certain other additives to improve impact strength, plasticize, improve processability, extend, fill, lubricate, prevent oxidation, flame retard, dye, pigment, etc., the polymeric composition. Such additives are well known in the art and may be incorporated without departing from the scope of the invention. The amount of additives may vary widely according to the additive, and/or its form, and/or its concentration.

PREPARATION

The blends of this invention can be prepared by any suitable means including blending, tumbling and extrusion. Examples of these methods include, but are not limited to, dry mixing in the form of a powder, wet mixing in the form of a solution or slurry, and melt extrusion compounding.

The polymer or polymers of styrene, epoxy modified styrene/styrene copolymer, glass, and any other ingredients or additives, may be mechanically blended together in the desired proportions with the aid of any suitable mixing device conveniently used for mixing rubbers or plastics, such as, for example, a differential roll mill, a Banbury mixer, or an extruder.

The components can be added any time during processing. Batch or continuous processes can be used, as long as all components are well dispersed and well blended. A continuous process is presently preferred for ease of operation. One example of a continuous process is to add the polymers, stabilizer(s), commercially available glass fibers, and optionally, other additives to an extruder. The components can be added in any order. For example, all components can be dry mixed and then extruded. If preferred, the components can be added sequentially; for example, one or more polymers of styrene and epoxy modified styrene/styrene copolymer can be gravity fed into the throat of the extruder and then additional stabilizer(s) and glass fibers added downstream in the extruder after the polymers are blended. This latter example is the presently preferred process. Any two of the polymers may be blended in an extruder, pelletized and then re-extruded with a third polymer, glass and additives.

In these types of methods, the polymer(s) of styfane, epoxy modified styrene/styrene copolymer, glass, and any other components, filler and additives used, can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point of the polymers.

The presently preferred compounding method comprises blending the polymers, glass and any additives in powder or granular form, extruding the blend, chopping into pellets and final processing (such as injection molding or profile extrusion).

In order to facilitate thorough mixing of the polymers and glass, and to develop the desired combination of physical properties, the mechanical blending is carried out at a sufficiently high temperature to soften the polymers so that they are thoroughly dispersed and intermingled with each other. Usually the higher softening material of the composition will govern the mixing temperature selected. Generally, temperatures in the range of about 350° F. (180° C.) to about 450° F. (230° C.) would be used when incorporating monovinyl aromatic-conjugated dienes. Mixing is continued until an essentially uniform blend is obtained.

Alternatively, the polymers may be solution blended using one or more suitable solvents. Or, two polymers might be solution blended then subsequently mixed by solution blending, dry blending or melt extrusion with one or more other polymers.

The reinforced polymer blends of this invention can be made into structural components for outdoor or indoor applications, consumer products, and household equipment having improved mechanical and thermal properties. Articles made from the polymer(s) of styrene and epoxy modified styrene/styrene copolymer blends of this invention have excellent flexural strength, improved impact and tensile strength, and good thermal properties. Use of other polymers of styrene in reinforced blends with monovinyl aromatic-conjugated diene resins has obvious economic advantages. Thus, the discovery of how an additional blend component such as epoxy modified styrene/styrene copolymers can be used to enhance tile properties of reinforced blends of polymers of styrene and/or monovinyl aromatic-conjugated dienes is useful.

Using blends of polymers of styrene and epoxy modified styrene/styrene copolymers produces materials in which the properties such as tensile strength and flexural modulus can be improved without compromising impact strength.

The following examples will be used to describe the invention and should be taken as illustrative and not restrictive.

EXAMPLES

In the following examples, the following test methods were used.

| Property | ASTM Method |
| --- | --- |
| Flow rate, Condition 200/5.0, g/10 min | D 1238-89 |
| Tensile strength at yield and break, MPa | D 638-89 at 50 mm/min |
| Elongation, % | D 638-89 at 50 mm/min |
| Flexural modulus, MPa | D 790-86 |
| Flexural strength, MPa | D 790-86 |
| Izod impact strength, notched and unnotched, J/m | D 256-88 |
| Heat deflection temperature, °C. | D 648-82 (88) |

The epoxy modified styrene/styrene copolymer used in these examples was a macromonomer-based graft polymer having a melt flow of 47 g/10 min. The epoxy modified styrene/styrene copolymer used was RESEDA GP-500 epoxy modified styrene/styrene copolymer commercially available from Marubeni Specialty Chemicals, Inc.

The polystyrene used was general purpose polystyrene having a melt flow of 16 g/10 min, in pellet form (Polysar® 555, available from Polysar).

The monovinyl aromatic-conjugated diene copolymer used in these examples was KR03 grade K-Resin® polymer, a resinous styrene-butadiene copolymer commercially available from Phillips Petroleum Company. The K-Resin® polymer contained about 75 weight percent styrene and about 25 weight percent butadiene, and was a polymodal molecular weight distribution copolymer with a nominal flow rate of 8 g/10 min.

The glass used in these examples was Type 1156 Chopped Strand, G-filament glass fibers commercially available from PPG Industries, Inc.

EXAMPLE I

A series of polymer samples was prepared to demonstrate the effect of incorporating differing levels of an epoxy modified styrene/styrene copolymer in a blend of a resinous styrene-butadiene copolymer and general purpose polystyrene. Styrene-butadiene copolymer pellets, polystyrene pellets, epoxy modified styrene/styrene copolymer fluff and glass fiber were dry blended by shaking measured amounts in a bag. A 60:40 styrene-butadiene copolymer:polystyrene ratio and 20 weight percent glass level was used for all runs in this Example. The dry blended mixture was metered into a Werner & Pfleiderer ZSK-30 vented twin-screw extruder with a screw feeder. The blends were extruded with an open vent and with a barrel temperature of 210° C. The extruded polymer blend was injection molded into test specimens on an Engel 55-ton injection molder with a barrel temperature of 210° C. and a mold temperature of 25° C.

Polymer 1 was a control sample containing only glass and a 60:40 blend of styrene-butadiene and polystyrene; Polymers 2, 3 and 4 were prepared with varying amounts of 5 to 15 weight percent epoxy modified styrene/styrene copolymer. The injection molded parts were tested for their properties and the results are given in Table I.

TABLE I

| | Polymer Properties | | | |
| --- | --- | --- | --- | --- |
| | Comparison Polymer 1 | Invention Polymer 2 | Invention Polymer 3 | Invention Polymer 4 |
| Components[a] | | | | |
| styrene-butadiene copolymer | 48 | 45 | 42 | 39 |
| polystyrene | 32 | 30 | 28 | 26 |
| glass, wt % | 20 | 20 | 20 | 20 |
| epoxy modified styrene/styrene copolymer, wt % | 0 | 5 | 10 | 15 |
| Properties | | | | |
| Tensile yield, MPa | 50.2 | 61.4 | 68.2 | 74.8 |
| Tensile Break, MPa | 49.7 | 60.1 | 67.0 | 74.0 |
| Elongation, % | 4.0 | 8.6 | 8.0 | 7.5 |
| Flexural modulus, MPa | 3930 | 4140 | 4490 | 4640 |
| Flexural strength, MPa | 67.0 | 87.2 | 98.4 | 105 |
| Izod impact, notched, J/m | 43.2 | 83.3 | 95.0 | 90.2 |
| Izod impact, unnotched, J/m | 235 | 414 | 433 | 449 |
| Heat deflection temperature, °C. | 81.5 | 83.5 | 85.3 | 86.3 |

[a]All blends had a 60:40 styrene-butadiene copolymer:polystyrene ratio.

The runs of this example demonstrate that dramatic improvement in unnotched Izod impact strength, flexural strength and percent elongation and significant improvement in notched Izod, flexural modulus, tensile break and tensile strength are achieved by addition of 5 weight percent epoxy modified styrene/styrene copolymer in 60:40 styrene-butadiene copolymer: polystyrene blends. Izod strength, tensile strength, flexural strength and heat deflection temperature were further increased by addition of larger amounts of the epoxy modified styrene/styrene copolymer to the 60:40 styrene-butadiene copolymer: polystyrene blends. This is unexpected because typically the impact strength of a material decreases when the tensile strength and flexural modulus a re-enhanced.

EXAMPLE II

Six runs were made to demonstrate the efficacy of the epoxy modified styrene/styrene copolymer in improving properties of glass reinforced blends of varying ratios of amounts of styrene-butadiene copolymer and polystyrene in the blends. Polymer samples 5 through 10 were prepared in the manner described in Example I using levels of 0 or 10 weight percent epoxy modified styrene/styrene copolymer in: (a) 100 weight percent styrene-butadiene copolymer; (b) 60:40 blend of styrene-butadiene copolymer: polystyrene; and (c) 100 weight percent polystyrene.

Injection molded test specimens were tested and exhibited the properties given in Table II.

TABLE II

|  | Polymer Properties | | | | | |
|---|---|---|---|---|---|---|
|  | Comparison Polymer 5 | Invention Polymer 6 | Comparison Polymer 7 | Invention Polymer 8 | Comparison Polymer 9 | Invention Polymer 10 |
| Components |  |  |  |  |  |  |
| Styrene-butadiene copolymer, wt % | 80 | 70 | 48 | 42 | 0 | 0 |
| Polystyrene, wt % | 0 | 0 | 32 | 28 | 80 | 70 |
| Glass, wt % | 20 | 20 | 20 | 20 | 20 | 20 |
| Epoxy modified styrene/ styrene copolymer, wt % | 0 | 10 | 0 | 10 | 0 | 10 |
| Properties |  |  |  |  |  |  |
| Tensile yield, MPa | 37.6 | 47.0 | 53.5 | 66.6 | 63.5 | 85.7 |
| Tensile break, MPa | 16.7 | 43.7 | 53.3 | 65.8 | 63.5 | 85.7 |
| Elongation, | 9.0 | 9.8 | 2.9 | 4.0 | 4.0 | 7.3 |
| Flexural modulus, MPa | 3190 | 3530 | 4310 | 4550 | 5810 | 6040 |
| Flexural strength, MPa | 50.5 | 65.7 | 68.0 | 91.4 | 83.6 | 118 |
| Izod impact, notched J/m | 83.8 | 150 | 47.5 | 73.7 | 25.6 | 40.0 |
| Izod impact, unnotched, J/m | 283 | 479 | 226 | 390 | 98.8 | 218 |
| Heat deflection temperature, °C. | 78.4 | 80.1 | 81.3 | 80.5 | 84.1 | 82.3 |

*a*Weight percents are based on total weight of the compound.

The results of testing articles made from polymers 5, 6, 7, 8, 9 and 10 demonstrate that addition of the epoxy modified styrene/styrene copolymer will improve flexural modulus, flexural strength, tensile yield strength, tensile break strength, percent elongation and notched and unnotched izod impact strength while not significantly compromising thermal properties. This improvement is shown over all ratios of amounts of styrene-butadiene copolymer to polystyrene in the glass reinforced blends.

This significant improvement in properties at all ratios of amounts of monovinyl aromatic-conjugated diene copolymer and polymer of styrene in blends is surprising because improvements in impact strength are not expected to be as great when low levels of monovinyl aromatic-conjugated diene copolymer are used in the blend.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

That which is claimed is:

1. A blend composition comprising:
   (a) at least one epoxy modified styrene/styrene copolymer;
   (b) at least one resinous styrene-conjugated diene copolymer, containing about 55–95 weight percent polymerized styrene wherein said conjugated diene is selected from the group consisting of butadiene and isoprene; and
   (c) glass.

2. A composition as recited in claim 1 wherein said resinous styrene-conjugated diene copolymer is a styrene-butadiene block copolymer containing about 65–90 weight percent polymerized styrene.

3. A composition as recited in claim 1 wherein said epoxy modified styrene/styrene copolymer is a macromonomer-based graft polymer.

4. A composition as recited in claim 3 wherein said epoxy modified styrene/styrene copolymer 1
   has been prepared by copolymerzing high molecular weight styrene-based macromolecular monomers with low molecular weight styrenic segmnents having epoxy-functional groups.

5. A composition as recited in claim 1 wherein said epoxy modified styrene/styrene copolymer is present in an amount sufficient to improve the impact strength of articles made from said composition.

6. A composition as recited in claim 1 wherein said epoxy modified styrene/styrene copolymer is present in an amount sufficient to improve the flexural strength of articles made from said composition.

7. A composition as recited in claim 1 wherein said epoxy modified styrene/styrene copolymer is present in an amount in the range of about 1 to about 35 weight percent, based on the total weight of said composition;
   wherein said resinous styrene-conjugated diene copolymer is present in an amount in the range of about 15 to about 94 weight percent, based on the total weight of said composition; and
   wherein said glass is present in an amount in the range of about 5 to about 50 weight percent, based on the total weight of said composition.

8. A composition as recited in claim 1 wherein said epoxy modified styrene/styrene copolymer is present in an amount in the range of about 2 to about 20 weight percent, based on the total weight of said composition;
   wherein said resinous styrene-conjugated diene copolymer is present in an amount in the range of about 40 to about 91 weight percent, based on the total weight of said composition; and
   wherein said glass is present in an amount in the range of about 7 to about 40 weight percent, based on the total weight of said composition.

9. A composition as recited in claim 1 wherein said epoxy modified styrene/styrene copolymer is present in an amount in the range of about 3 to about 15 weight percent, based on the total weight of said composition;
   wherein said resinous styrene-conjugated diene copolymer is present in an amount in the range of about 55 to about 87 weight percent, based on the total weight of said composition; and wherein said glass is present in an amount in the range of about 10 to about 30 weight percent, based on the total weight of said composition.

10. Articles made of the composition of claim 1.

11. Articles made of the composition of claim 2.

12. A composition as recited in claim 2 consisting essentially of said epoxy modified styrene/styrene copolymer, said resinous styrene-butadiene block copolymer and said glass.

13. A composition as recited in claim 1 further comprising styrene homopolymer
wherein said styrene homopolymer is present in an amount in the range of about 10 to about 50 weight percent, based on the total weight of said styrene-conjugated diene copolymer and said styrene homopolymer.

14. A composition as recited in claim 13 wherein said resinous styrene-conjugated diene copolymer is a styrene-butadiene block copolymer containing about 65–90 weight percent polymerized styrene.

15. A composition as recited in claim 13
wherein said epoxy modified styrene/styrene copolymer is present in an amount in the range of about 1 to about 35 weight percent, based on the total weight of said composition;
wherein said resinous styrene-conjugated diene copolymer is present in an amount in the range of about 2 to about 98 weight percent, based on the total weight of said styrene-conjugated diene copolymer and said styrene homopolymer;
wherein the combined weight of said resinous styrene-conjugated diene copolymer and said styrene homopolymer is in the range of about 15 to about 94 weight percent, based on the total weight of said composition; and
wherein said glass is present in an amount in the range of about 5 to about 50 weight percent, based on the total weight of said composition.

16. A composition as recited in claim 13
wherein said epoxy modified styrene/styrene copolymer is present in an amount in the range of about 2 to about 20 weight percent, based on the total weight of said composition;
wherein said resinous styrene-conjugated diene copolymer is present in an amount in the range of about 50 to about 90 weight percent, based on the total weight of said styrene-conjugated diene copolymer and said styrene homopolymer;
wherein the combined weight of said resinous styrene-conjugated diene copolymer and said styrene homopolymer is in the range of about 40 to about 91 weight percent, based on the total weight of said composition; and
wherein said glass is present in an amount in the range of about 7 to about 40 weight percent, based on the total weight of said composition.

17. A composition as recited in claim 13
wherein said epoxy modified styrene/styrene copolymer is present in an amount in the range of about 3 to about 15 weight percent, based on the total weight of said composition;
wherein said resinous styrene-conjugated diene copolymer is present in an amount in the range of about 70 to about 85 weight percent, based on the total weight of said styrene-conjugated diene copolymer and said styrene homopolymer;
wherein said styrene homopolymer is present in an amount in the range of about 15 to about 30 weight percent, based on the total weight of said styrene-conjugated diene copolymer and said styrene homopolymer;
wherein the combined weight of said resinous styrene-conjugated diene copolymer and said styrene homopolymer is in the range of about 55 to about 87 weight percent, based on the total weight of said composition; and
wherein glass is present in an amount in the range of about 10 to about 30 weight percent, based on the total weight of said composition.

18. A composition in accordance with claim 14 consisting essentially of said at least one epoxy modified styrene/styrene copolymer, said resinous styrene-butadiene block copolymer, said glass, and said styrene homopolymer.

19. Articles made of the composition of claim 13.

20. Articles made of the composition of claim 14.

* * * * *